(12) United States Patent
Gopal et al.

(10) Patent No.: US 9,961,600 B2
(45) Date of Patent: May 1, 2018

(54) TECHNIQUES FOR EMPLOYING ANTENNA SWITCHED DIVERSITY IN WIRELESS COMMUNICATIONS

(71) Applicant: QUALCOMM Incorporated, San Diego, CA (US)

(72) Inventors: Thawatt Gopal, San Diego, CA (US); Reza Shahidi, San Diego, CA (US); Sunil Kc, Niwot, CO (US); Qingxin Chen, San Diego, CA (US); Shivram Ramanathan Lnu, San Diego, CA (US); Ahmed Saifuddin, San Diego, CA (US); Robert Chan, La Jolla, CA (US); Praveen Adusumilli, San Diego, CA (US); Shahabuddin Mohammad, San Diego, CA (US); Sandeep Narayana, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/638,096

(22) Filed: Jun. 29, 2017

(65) Prior Publication Data

US 2018/0007600 A1    Jan. 4, 2018

Related U.S. Application Data

(60) Provisional application No. 62/357,241, filed on Jun. 30, 2016.

(51) Int. Cl.
*H04W 36/08*    (2009.01)
*H04W 36/30*    (2009.01)
(Continued)

(52) U.S. Cl.
CPC .............. *H04W 36/08* (2013.01); *H04B 7/04* (2013.01); *H04W 24/02* (2013.01); *H04W 24/10* (2013.01); *H04W 36/30* (2013.01)

(58) Field of Classification Search
CPC ..... H04W 36/08; H04W 24/02; H04W 24/10; H04W 36/30; H04B 7/04
See application file for complete search history.

(56) References Cited

U.S. PATENT DOCUMENTS 5,127,100 A  *  6/1992  D'Amico .............. H04W 88/08
                                                    370/336
8,670,390 B2      3/2014  Shattil
(Continued)

OTHER PUBLICATIONS

International Search Report and Written Opinion—PCT/US2017/040254—ISA/EPO—dated Oct. 4, 2017. (19 total pages).

*Primary Examiner* — Mehmood B. Khan
(74) *Attorney, Agent, or Firm* — Arent Fox, LLP

(57) ABSTRACT

Aspects described herein relate to using antenna-switched diversity (ASDIV) in wireless communications. A serving node can be communicated with using a serving radio access technology (RAT) and based on an ASDIV configuration, wherein the ASDIV configuration defines an antenna switching configuration including a state of one or more switches in an ASDIV switch group for switching between one or more antennas for the communicating based on sensing one or more parameters of the communicating. It can be determined whether a target RAT supports operating using a same ASDIV switch group as the serving RAT. A target node can be communicated with using the target RAT and based on the ASDIV configuration where the target RAT operates using the same ASDIV switch group as the serving RAT.

28 Claims, 10 Drawing Sheets

(51) Int. Cl.
*H04B 7/04* (2017.01)
*H04W 24/10* (2009.01)
*H04W 24/02* (2009.01)

(56) References Cited

U.S. PATENT DOCUMENTS

| | | | |
|---|---|---|---|
| 8,730,922 B2* | 5/2014 | Hultell | H04B 7/0404 370/329 |
| 9,326,177 B2 | 4/2016 | Liu et al. | |
| 9,578,520 B2* | 2/2017 | Bhattad | H04B 7/0802 |
| 2002/0131381 A1* | 9/2002 | Kim | H04B 7/022 370/335 |
| 2005/0176468 A1 | 8/2005 | Iacono et al. | |
| 2009/0291686 A1 | 11/2009 | Alpert et al. | |
| 2010/0260147 A1* | 10/2010 | Xing | H04K 3/226 370/332 |
| 2011/0136446 A1* | 6/2011 | Komninakis | H04B 7/0691 455/78 |
| 2012/0046003 A1 | 2/2012 | Ying | |
| 2013/0051261 A1 | 2/2013 | Kazmi et al. | |
| 2013/0307727 A1* | 11/2013 | He | H04B 7/0608 342/374 |
| 2013/0308554 A1* | 11/2013 | Ngai | H04B 7/0404 370/329 |
| 2013/0310045 A1* | 11/2013 | Yan | H04B 7/0608 455/437 |
| 2014/0024323 A1* | 1/2014 | Clevorn | H04W 52/0229 455/83 |
| 2014/0233665 A1* | 8/2014 | Clevorn | H04B 7/04 375/267 |
| 2015/0011236 A1* | 1/2015 | Kazmi | H04B 17/27 455/456.1 |
| 2015/0215793 A1 | 7/2015 | Siomina et al. | |
| 2015/0326287 A1* | 11/2015 | Kazmi | H04W 52/0216 375/267 |
| 2015/0373711 A1 | 12/2015 | Narathong et al. | |

* cited by examiner

TECHNIQUES FOR EMPLOYING ANTENNA SWITCHED DIVERSITY IN WIRELESS COMMUNICATIONS

CLAIM OF PRIORITY UNDER 35 U.S.C. § 119

The present application for patent claims priority to Provisional Application No. 62/357,241, entitled "TECHNIQUES FOR EMPLOYING ANTENNA SWITCHED DIVERSITY IN WIRELESS COMMUNICATIONS" filed Jun. 30, 2016, which is assigned to the assignee hereof and hereby expressly incorporated by reference herein for all purposes.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple user equipment devices. Each user equipment (UE) communicates with one or more base stations, such as an evolved Node B (eNB) via transmissions on the forward and reverse links. The forward link (or downlink) refers to the communication link from the eNBs to the UEs, and the reverse link (or uplink) refers to the communication link from the UEs to the eNBs. This communication link may be established via a single-in-single-out, multiple-in-single-out or a multiple-in-multiple-out (MIMO) system. In this regard, the UEs can access wireless network via one or more eNBs.

UEs can communicate with a plurality of different eNBs that may use different radio access technologies (RAT) and/or different frequency resources for communicating. The UEs can communicate with the different eNBs to measure signals received therefrom, performing inter-RAT handover between the eNBs, etc. In addition, UEs can include multiple antennas positioned around the UE, where one or more of the multiple antennas can be used to communicate with the eNBs using antenna-switched diversity (ASDIV). Using multiple antennas in this regard allows for switching between ASDIV antenna configurations when one configuration may have undesirable radio conditions (e.g., due to being obstructed by a user's hand, which can be referred to as "death grip," or other obstacle). When an ASDIV antenna configuration is selected and the UE begins communicating with a different eNB (e.g., using another RAT), the ASDIV configuration may be modified for the different eNB, which may result in using an antenna with undesirable radio conditions, and thus dropping of a call or other session between the UE and eNB.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for using antenna-switched diversity (ASDIV) in wireless communications is provided. The method includes communicating with a serving node using a serving radio access technology (RAT) and based on an ASDIV configuration, where the ASDIV configuration defines an antenna switching configuration including a state of one or more switches in an ASDIV switch group for switching between one or more antennas for the communicating based on sensing one or more parameters of the communicating. The method also includes determining whether a target RAT supports operating using a same ASDIV switch group as the serving RAT, and communicating with a target node using the target RAT and based on the ASDIV configuration where the target RAT operates using the same ASDIV switch group as the serving RAT.

In other aspects, an apparatus for using ASDIV in wireless communications is provided. The apparatus includes a plurality of antennas for transmitting and receiving signals in wireless communications, a transceiver coupled with the plurality of antennas and including a radio frequency (RF) front end with a plurality of components for generating the signals, wherein the plurality of components include one or more ASDIV switches coupled to the plurality of antennas to enable switching between one or more of the plurality of antennas for transmitting and receiving the signals, a memory, and at least one processor coupled to the memory and the transceiver. The at least one processor is configured to communicate, via the transceiver, with a serving node using a serving RAT and based on an ASDIV configuration, where the ASDIV configuration defines an antenna switching configuration including a state of one or more switches in an ASDIV switch group for switching between one or more antennas for the communicating based on sensing one or more parameters of the communicating. The at least one processor is further configured to determine whether a target RAT supports operating using a same ASDIV switch group as the serving RAT, and communicate, via the transceiver, with a target node using the target RAT and based on the ASDIV configuration where the target RAT operates using the same ASDIV switch group as the serving RAT.

In another aspect, an apparatus for using ASDIV in wireless communications is provided. The apparatus includes means for communicating with a serving node using a serving RAT and based on an ASDIV configuration, wherein the ASDIV configuration defines an antenna switching configuration including a state of one or more switches in an ASDIV switch group for switching between one or more antennas for the communicating based on sensing one or more parameters of the communicating. The apparatus also includes means for determining whether a target RAT supports operating using a same ASDIV switch group as the serving RAT, and means for communicating with a target node using the target RAT and based on the ASDIV configuration where the target RAT operates using the same ASDIV switch group as the serving RAT.

In another aspect, a non-transitory computer-readable storage medium including computer-executable code for using ASDIV in wireless communications is provided. The code includes code for communicating with a serving node using a serving RAT and based on an ASDIV configuration, wherein the ASDIV configuration defines an antenna switching configuration including a state of one or more switches in an ASDIV switch group for switching between one or more antennas for the communicating based on sensing one or more parameters of the communicating. The code also includes code for determining whether a target RAT supports operating using a same ASDIV switch group as the serving RAT, and code for communicating with a target node using the target RAT and based on the ASDIV configuration where the target RAT operates using the same ASDIV switch group as the serving RAT.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
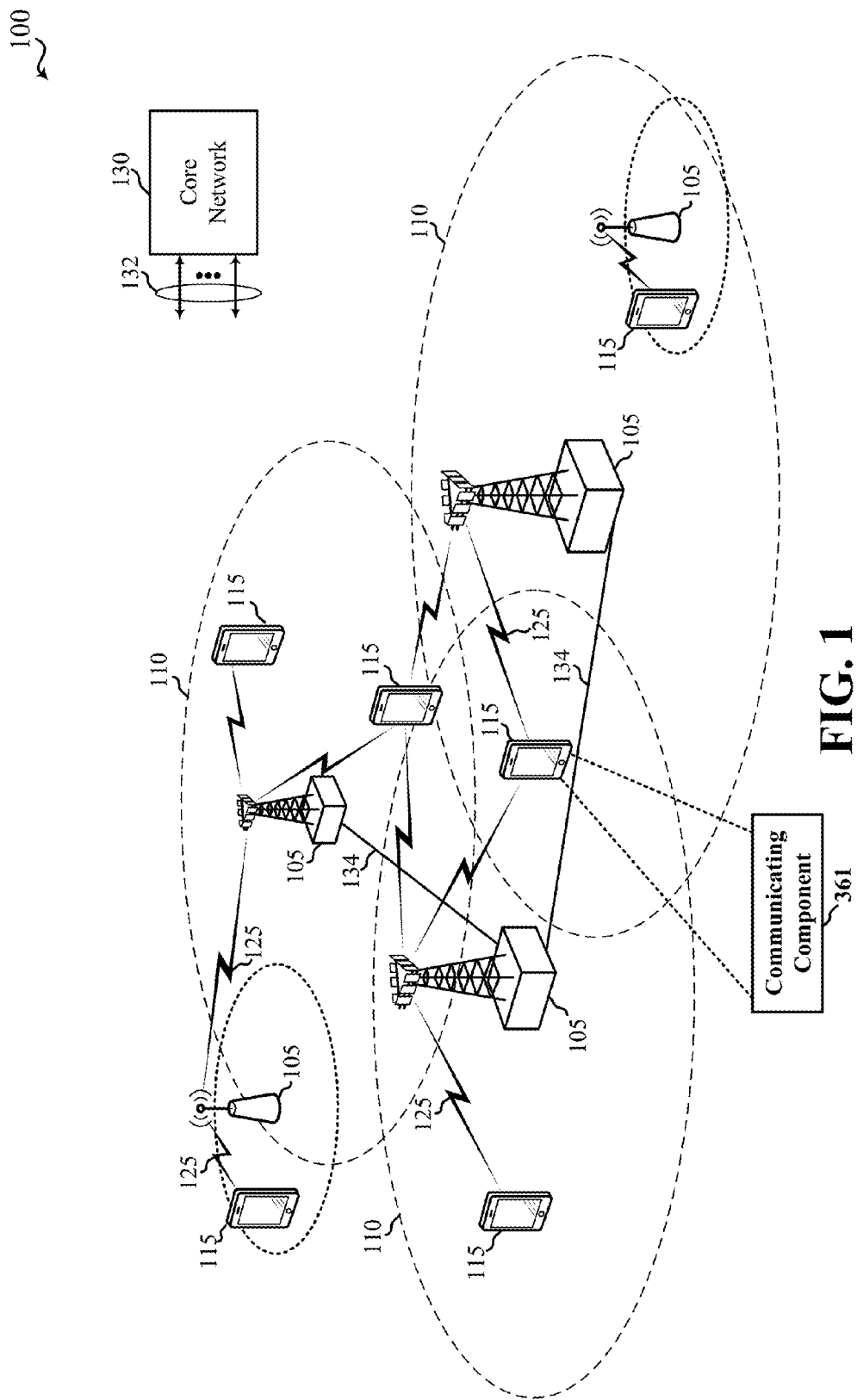
FIG. 1 shows a block diagram conceptually illustrating an example of a telecommunications system, in accordance with aspects described herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described herein are various aspects related to using antenna-switched diversity (ASDIV) in multiple radio access technology (RAT) configurations. For example, ASDIV can refer to a configuration where a device (e.g., a user equipment (UE)) employs multiple antennas to communicate with one or more nodes (e.g., evolved Node B (eNB)), where the device can switch between the antennas being used by using one or more switches coupled to the antennas, and/or according to an associated ASDIV configuration. For example, where radio conditions of the one or more antennas associated with an ASDIV configuration become undesirable (e.g., where a corresponding received signal strength indicator (RSSI) drops below a threshold, reference signal received power (RSRP) or reference signal received quality (RSRQ) drop below a threshold, etc.), the device can select a different ASDIV configuration for employing other antenna(s) to communicate with the one or more nodes (e.g., a serving eNB).

In an example, the device can communicate with the serving eNB using a first RAT and may attempt to communicate with a target eNB using a second RAT such to perform inter-RAT measurements of the target eNB, perform inter-RAT handover to the target eNB, etc. In this example, the device can determine whether communications with the target eNB using the second RAT can inherit the ASDIV configuration being used in communications with the source eNB using the first RAT. If so, the device can use the same or similar ASDIV configuration for communicating with the target eNB such to prevent dropping a call or other service interruption that may otherwise occur by switching ASDIV configurations (e.g., to a default ASDIV configuration for the second RAT communications with the target eNB). In an example, determining whether the communications with the target eNB can inherit the ASDIV configuration being used with the source eNB may include determining whether the device uses similar radio frequency (RF) components to communicate with the source eNB and target eNB, whether the source eNB and target eNB operate in similar or adjacent frequency bands, etc.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, user equipment, or user equipment device. A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, access node, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (WiFi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN (WLAN), BLUETOOTH and any other short- or long-range, wireless communication techniques.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. One or more of UEs 115 can include a communicating component 361 for communicating with the one or more access points 105 using one or more ASDIV configurations.

Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each of the communication links 125 may be a multi-carrier signal modulated according to the various radio technologies described above. Each modulated signal may be sent on a different carrier and may carry control information (e.g., reference signals, control channels, etc.), overhead information, data, etc.

In this regard, a UE 115 can be configured to communicate with one or more access points 105 over multiple carriers using carrier aggregation (CA) (e.g., with one access point 105) and/or multiple connectivity (e.g., with multiple access points 105). In either case, the UE 115 can be configured with at least one primary cell (PCell) configured to support uplink and downlink communications between the UE 115 and an access point 105. It is to be appreciated that there can be a PCell for each of the communication links 125 between a UE 115 and a given access point 105. In addition, each of the communication links 125 can have one or more secondary cells (SCell) that can support uplink and/or downlink communications as well. In some examples, the PCell can be used to communicate at least a control channel, and the SCell can be used to communicate a data channel.

The access points 105 may wirelessly communicate with the UEs 115 via one or more access point antennas. Each of the access points 105 sites may provide communication coverage for a respective coverage area 110. In some examples, the access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 115 with service subscriptions with the network provider. A small cell may cover a relatively smaller geographic area and may allow unrestricted access by UEs 115 with service subscriptions with the network provider, for example. In addition or alternatively to unrestricted access, a small cell may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells. The term eNB, as used generally herein, may relate to a macro eNB and/or a small cell eNB.

In an example, a small cell may operate in an "unlicensed" frequency band or spectrum, which can refer to a portion of radio frequency (RF) space that is not licensed for use by one or more wireless wide area network (WWAN) technologies, but may or may not be used by other communication technologies (e.g., wireless local area network (WLAN) technologies, such as Wi-Fi). Moreover, a network or device that provides, adapts, or extends its operations for use in an "unlicensed" frequency band or spectrum may refer to a network or device that is configured to operate in a contention-based radio frequency band or spectrum. In addition, for illustration purposes, the description below may refer in some respects to an LTE system operating on an unlicensed band by way of example when appropriate, although it is to be appreciated that such descriptions are not intended to exclude other cellular communication technologies. LTE on an unlicensed band may also be referred to herein as LTE/LTE-Advanced in unlicensed spectrum, or simply LTE, in the surrounding context.

The core network 130 may communicate with the eNBs or other access points 105 via a backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), multiple connectivity (e.g., CA with each of one or more access points 105) or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for the UEs 115 as well as increasing network and spectrum utilization.

As mentioned, in some examples the access points 105 and UEs 115 may utilize carrier aggregation to transmit on multiple carriers. In some examples, the access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer.

In an example, a UE 115 may communicate with a serving access point 105 using a serving RAT via communicating component 361, and may use ASDIV to switch among antennas for communicating with the serving access point 105. For example, communicating component 361 may use ASDIV according to one or more ASDIV configurations that define an antenna switch configuration including a switch state of one or more switches for using one or more of the antennas. In performing inter-RAT communications with a second access point (e.g., a target access point), communicating component 361 can determine whether the second access point uses a target RAT that can operate using ASDIV with the same or similar switches as defined by the ASDIV configuration. If so, communicating component 361 can utilize the ASDIV configuration for additionally communicating with the second access point.

Figure 2:
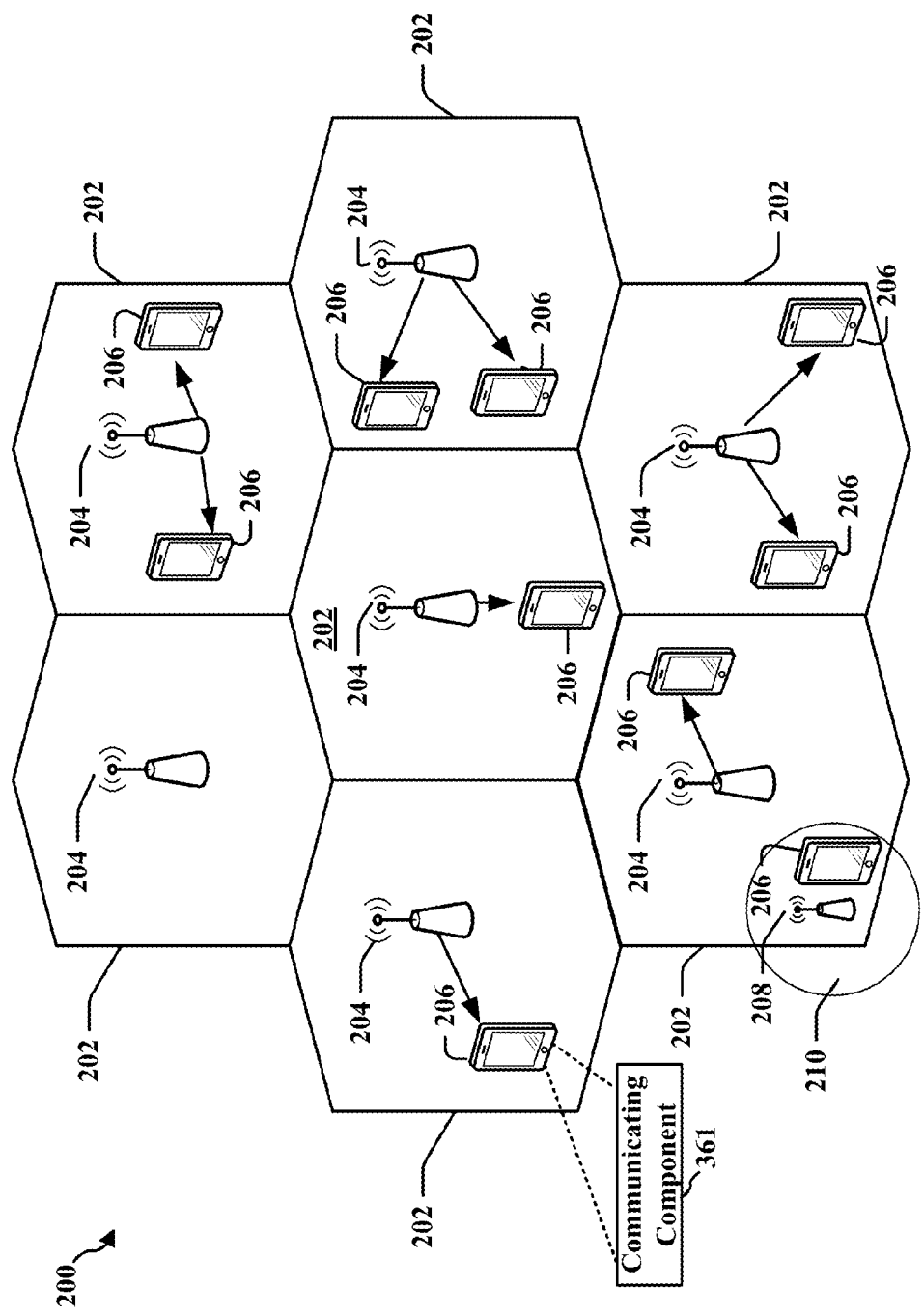
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more small cell eNBs 208 may have cellular regions 210 that overlap with one or more of the cells 202. The small cell eNBs 208 may be of a lower power class (e.g., home eNB (HeNB)), femto cell pico cell, micro cell, or remote radio head (RRH). The macro eNBs 204 are each assigned to a respective cell 202 and are configured to provide an access point to the core network 130 for all the UEs 206 in the cell 202. In an aspect, one or more of the UEs 206 can include a communicating component 361 for communicating with the one or more access points 105 using one or more ASDIV configurations. There is no centralized controller shown in this example of an access network 200, but a centralized controller may be used in alternative configurations. The eNBs 204/208 are responsible for all radio related functions including radio bearer control, admission control, mobility control, scheduling, security, and connectivity to a serving gateway.

The modulation and multiple access scheme employed by the access network 200 may vary depending on the particular telecommunications standard being deployed. In LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204/208 may have multiple antennas supporting MIMO technology. The use of MIMO technology enables the eNBs 204/208 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204/208 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
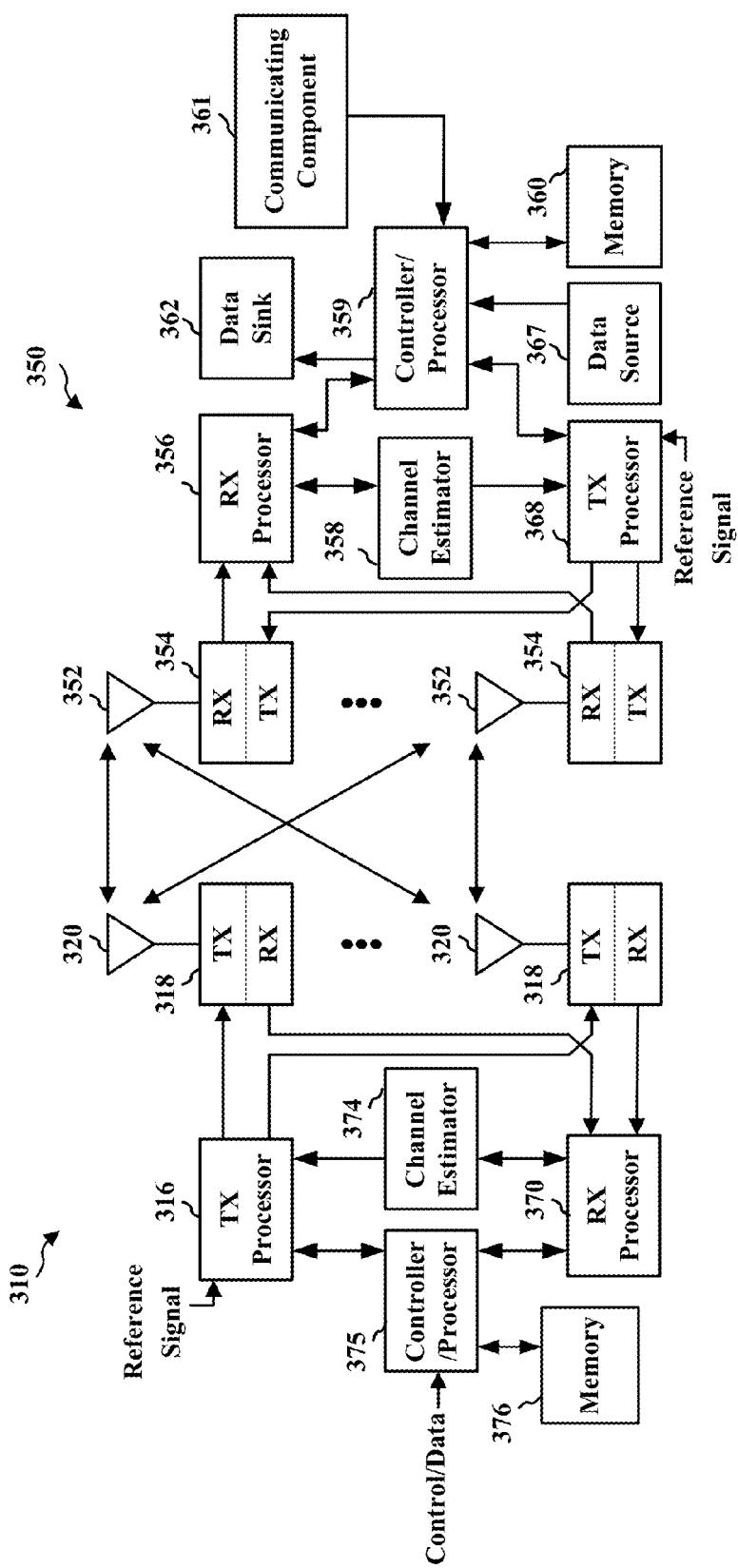
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for hybrid automatic repeat/request (HARD) operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations. In addition, the UE 350 may include a communicating component 361 for communicating with the one or more access points 105 using one or more ASDIV configurations. Though the communicating component 361 is shown as coupled to the controller/processor 359, it is to be appreciated that the communicating component 361 can also be coupled to other processors (e.g., RX processor 356, TX processor 368, etc.) and/or implemented by the one or more processors 356, 359, 368 to perform actions described herein.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
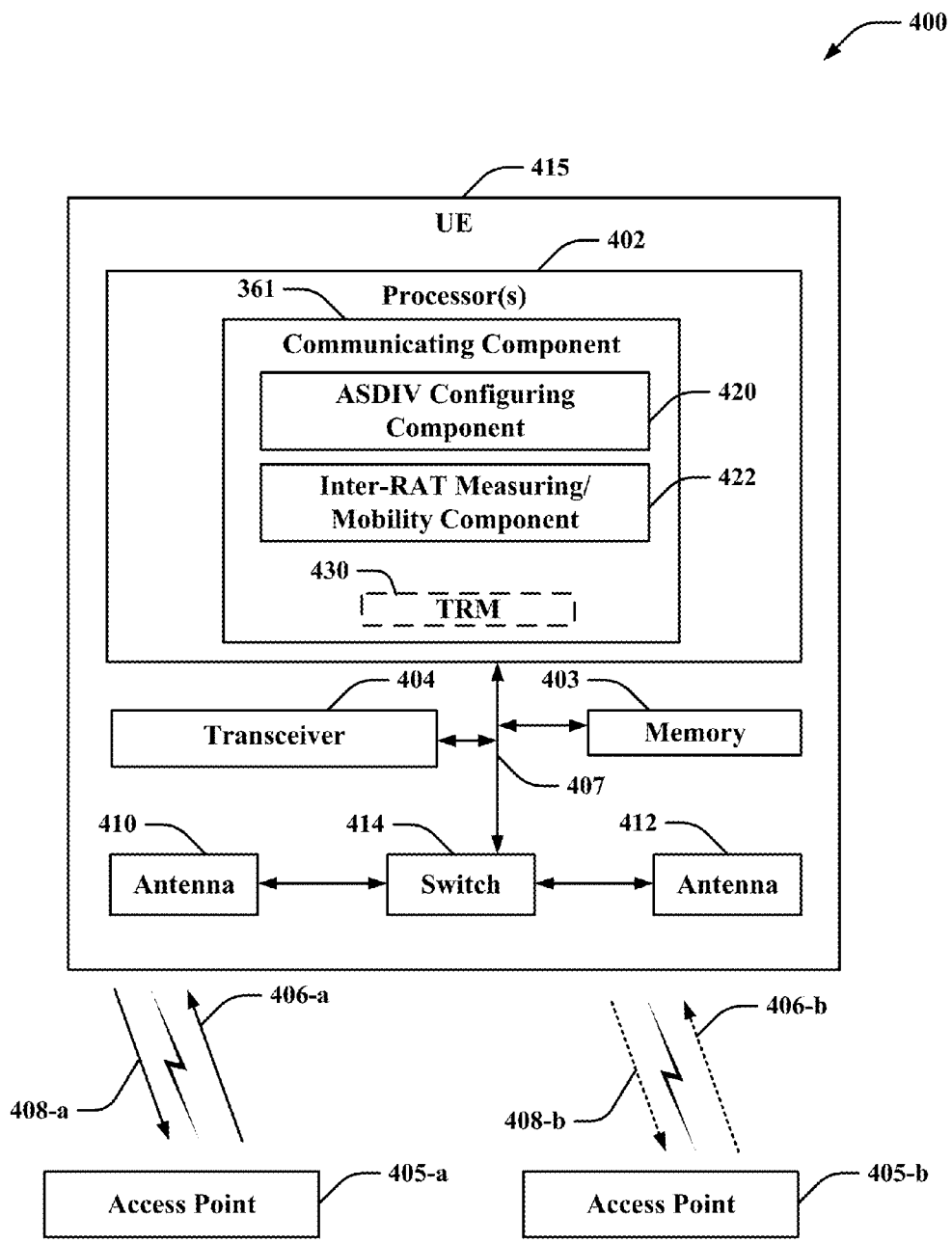
FIG. 4 illustrates an example of a system for managing antenna switch diversity in wireless communications in accordance with aspects described herein.
Figure 5:
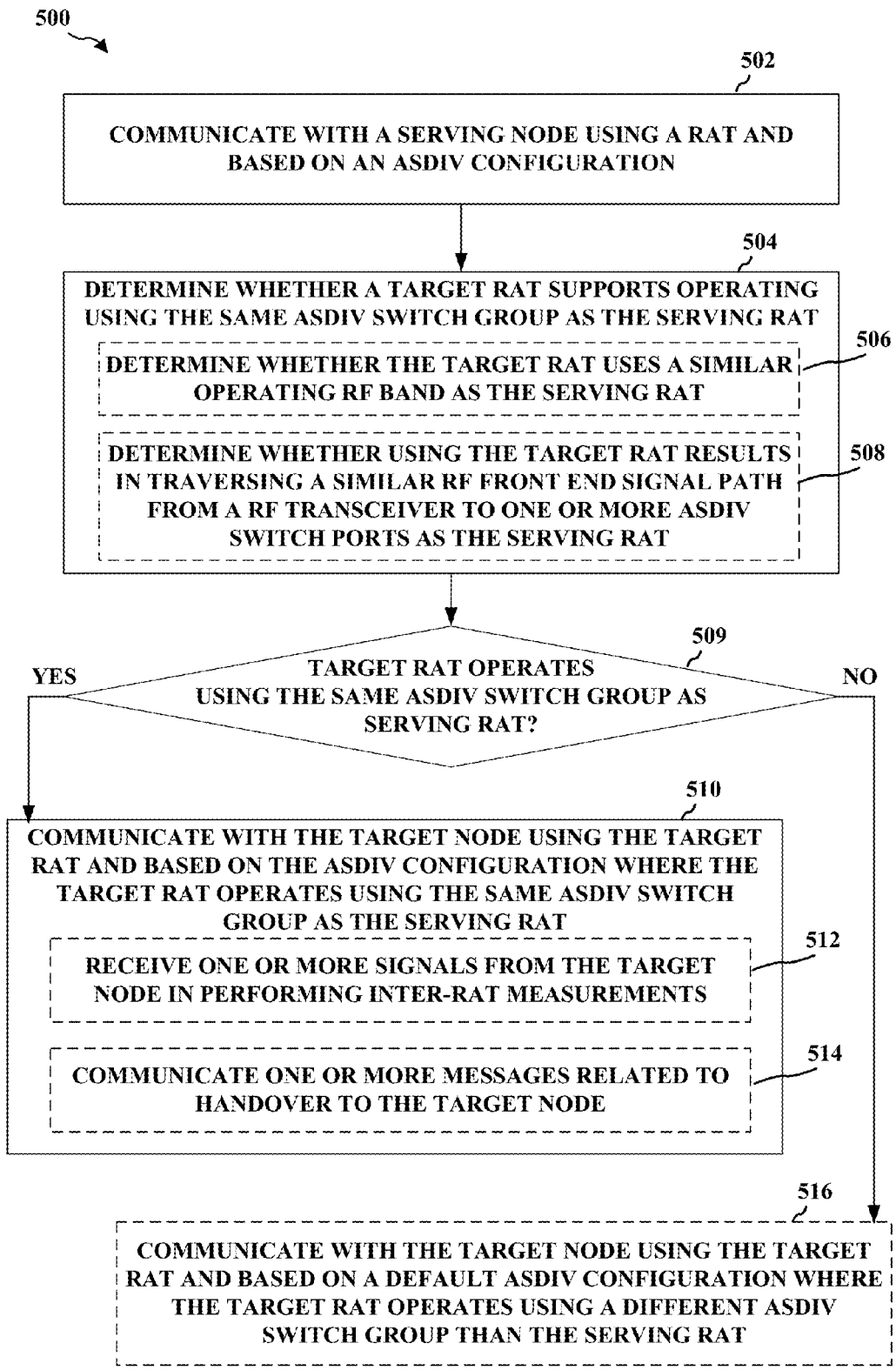
FIG. 5 illustrates an example of a method for managing antenna switch diversity in wireless communications in accordance with aspects described herein.
Figure 6:
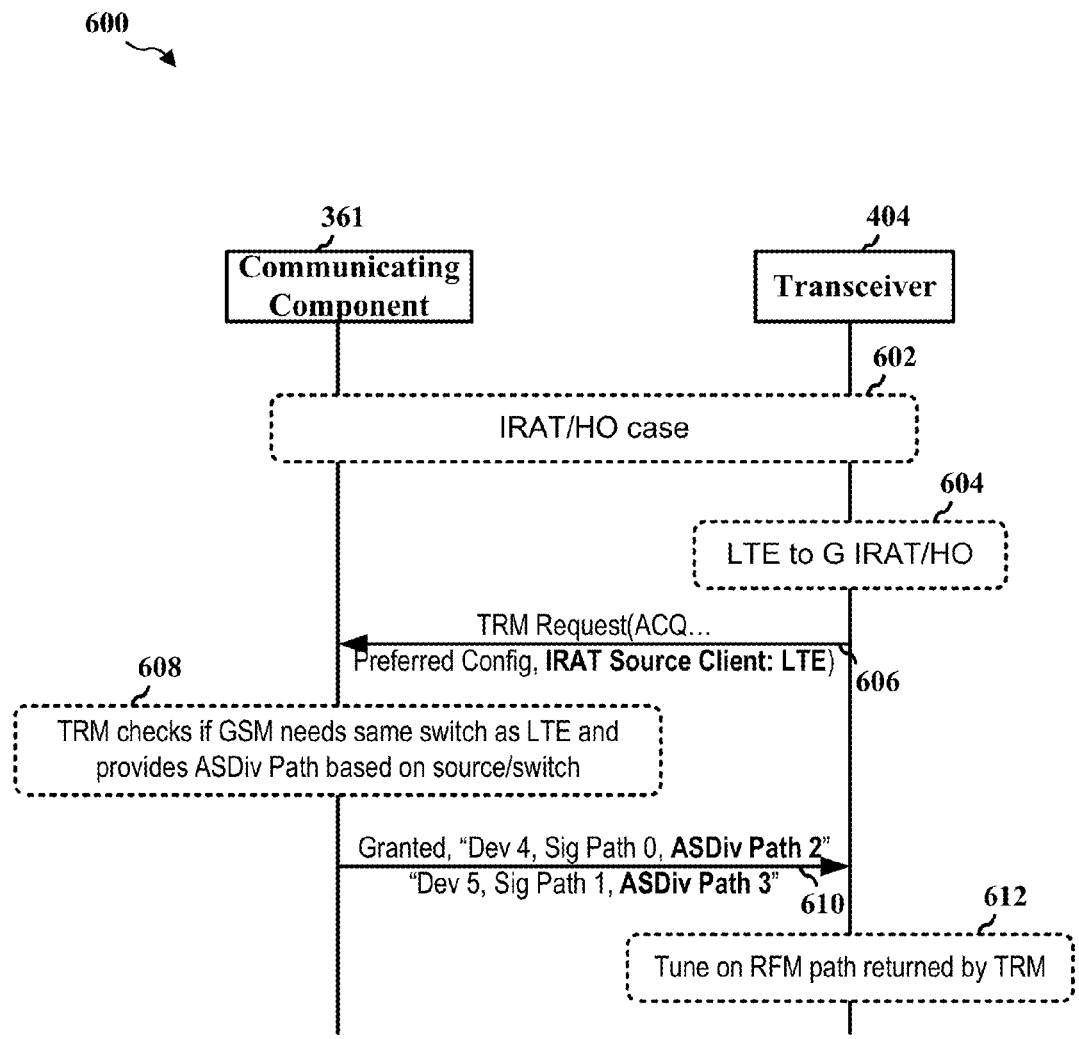
FIG. 6 illustrates an example of a system for managing antenna switch diversity in a handover case in accordance with aspects described herein.
Figure 7:
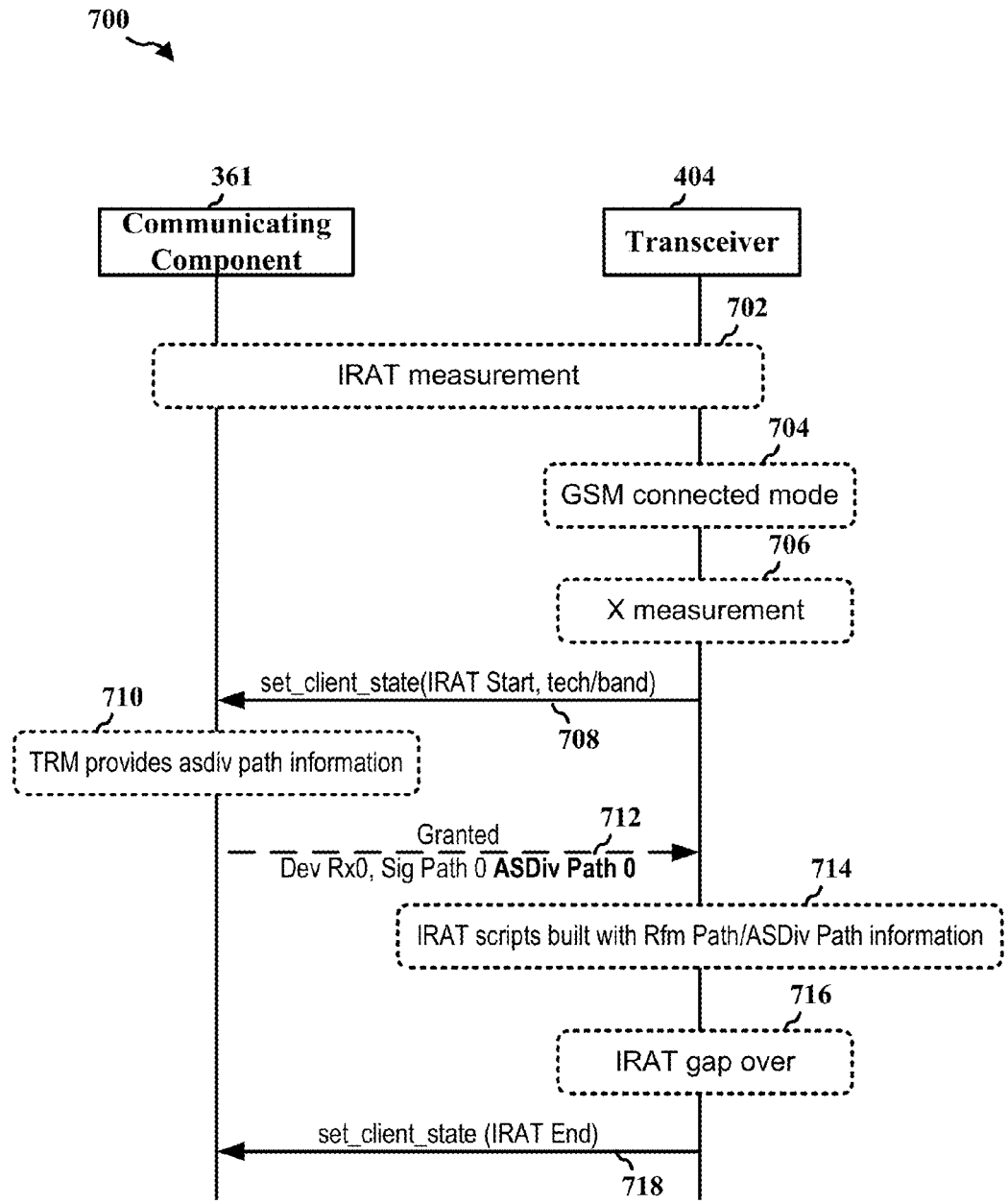
FIG. 7 illustrates an example of a system for managing antenna switch diversity in performing cell measurements in accordance with aspects described herein.

Turning now to FIGS. 4-7, aspects are depicted with reference to one or more components and one or more methods that may perform the actions or operations described herein, where aspects in dashed line may be optional. Although the operations described below in FIGS. 5-7 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

FIG. 4 depicts a system 400 for performing inter-frequency handover in accordance with aspects described herein. The system 400 includes a UE 415 that communicates with one or more access points 405-a, 405-b to access a wireless network, examples of which are described in FIGS. 1-3 above (e.g., UEs 115, 206, 350, access points/eNBs 105, 204, 208, 310, etc.). In one example, access points 405-a and 405-b may utilize different RATs for communicating in a wireless network (e.g., access point 405-a can use LTE while access point 405-b can use GSM, or vice versa, etc.). In an aspect, one or more downlink signals 406-a, 406-b can be transmitted by the access point 405-a, 405-b, respectively, and received by the UE 415 (e.g., via UE transceiver 404) for communicating control and/or data messages (e.g., signaling) from the access point 405-a, 405-b to the UE 415. Moreover, for example, one or more uplink signals 408-a, 408-b can be transmitted by the UE 415 (e.g., via UE transceiver 404) and received by the access point 405-a, 405-b, respectively for communicating control and/or data messages (e.g., signaling) from the UE 415 to the access point 405-a, 405-b over configured communication resources. In an aspect, access point 405-a can serve the UE 415 (e.g., provide wireless network access to the UE 415), and UE 415 can perform inter-RAT communications with access point 405-b (e.g., perform inter-RAT measurements of signals from the access point 405-b, communicate one or more messages related to performing inter-RAT handover to the access point 405-b, etc.).

In an aspect, UE 415 may include one or more processors 402 and/or memory 403 that may be communicatively coupled, e.g., via one or more buses 407. UE 415 may also include a transceiver 404 and/or other RF front end components to facilitate communicating wireless signals over a plurality of antennas 410, 412. Additionally, UE 415 may include one or more switches 414 to switch among one or more of the plurality of antennas 410, 412 to communicate wireless signals. Though not shown in FIG. 4 (but shown in FIGS. 8-10 for example), in some examples, the UE 415 may include substantially any number of antennas and corresponding switches to switch among the number of antennas. For example, UE 415 may include a plurality of switches, which may be referred to herein as a switch group, a switch module, and/or the like. Specifically, for example, the UE 415 may have multiple sets of antennas (e.g., with two or more antennas in a set) where each of these sets may have at least one switch that can be configured to change or modify communication via the set of antennas associated with the at least one switch. In an example, an ASDIV configuration can define one or more parameters, rules, etc. for determining behavior or states of the switches (e.g., for controlling communication via one or more of the antennas or sets of antennas) such to utilize different ones of the plurality of antennas in ASDIV.

The one or more processors 402 and/or memory 403, in an example, may operate in conjunction with or otherwise implement a communicating component 361 for communicating with the one or more access points 105 using one or more ASDIV configurations. For example, the various operations related to the communicating component 361 may be implemented or otherwise executed by one or more processors 402 and, in an aspect, can be executed by a single processor, while in other aspects, different ones of the operations may be executed by a combination of two or more different processors. For example, in an aspect, the one or more processors 402 may include any one or any combination of a modem processor, or a baseband processor, or a digital signal processor, or an application specific integrated circuit (ASIC), or a transmit processor, or a transceiver processor associated with UE transceiver 404. Further, for example, the memory 403 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 402. Moreover, the memory 403 or computer-readable storage medium may be resident in the one or more processors 402, external to the one or more processors 402, distributed across multiple entities including the one or more processors 402, etc.

In particular, the one or more processors 402 and/or memory 403 may execute actions or operations defined by communicating component 361 or its subcomponents. For instance, the one or more processors 402 and/or memory 403 may execute actions or operations defined by an ASDIV configuring component 420 for configuring one or more switches, switch groups, corresponding antennas, etc. for operating using ASDIV based on one or more rules or parameters defined in an ASDIV configuration. In an aspect, for example, ASDIV configuring component 420 may include hardware (e.g., one or more processor modules of the one or more processors 402) and/or computer-readable code or instructions stored in memory 403 and executable by at least one of the one or more processors 402 to perform the specially configured ASDIV configuring operations described herein. Further, for instance, the one or more processors 402 and/or memory 403 may execute actions or operations defined by an inter-RAT measuring/mobility component 422 for determining performing inter-RAT measurements, communicating inter-RAT handover messages, or performing substantially any function that relates to communicating with access points that utilize different RATs. In an aspect, for example, the inter-RAT measuring/mobility component 422 may include hardware (e.g., one or more processor modules of the one or more processors 402) and/or computer-readable code or instructions stored in memory 403 and executable by at least one of the one or more processors 402 to perform the specially configured inter-RAT communicating operations described herein.

In an example, transceiver 404 may be configured to transmit and receive wireless signals through one or more antennas 410, 412, an RF front end, one or more transmitters, one or more receivers, or other RF components, etc. In an aspect, the transceiver 404 may be tuned to operate at specified frequencies such that the UE 415 and/or the access point 405-a, 405-b can communicate at a certain frequency. In an aspect, the one or more processors 402 may configure the transceiver 404 to operate at a specified frequency and power level based on a configuration, a communication protocol, etc.

In an aspect, the transceiver 404 can operate in multiple bands (e.g., using a multiband-multimode modem, not shown) to process digital data sent and received using the transceiver 404. In an aspect, the transceiver 404 can be multiband and be configured to support multiple frequency bands for a specific communications protocol. In an aspect, the transceiver 404 can be configured to support multiple operating networks and communications protocols. Thus, for example, the transceiver 404 may enable transmission and/or reception of signals based on a specified modem configuration.

Referring to FIG. 5, an example method 500 is illustrated for communicating (e.g., by a UE) based on an ASDIV configuration. In method 500, blocks indicated as dashed boxes may represent optional steps.

In an example, method 500 includes, at Block 502, communicating with a serving node using a RAT and based on an ASDIV configuration. In an aspect, ASDIV configuring component 420 can configure one or more switches 414 to utilize one or more antennas 410, 412 based on the ASDIV configuration, and communicating component 361, e.g., in conjunction with the processor(s) 402, memory 403, and/or transceiver 404, can communicate with the serving node (e.g., access point 405-a) using a RAT and based on the ASDIV configuration. For example, the ASDIV configuration, as described, can define an antenna switch configuration, including a switch state (e.g., on or off), for one or more switches 414, where the one or more switches 414 are operable for switching between one or more antennas 410, 412 for communicating based on sensing parameters regarding the communicating. Thus, for example, where the parameters indicate undesirable radio conditions (e.g., RSSI, RSRP, RSRQ, etc. below a threshold), a different ASDIV configuration can be used to modify the switch state of one or more switches 414 to use different antennas 410, 412 to communicate with the access point 405-a. For example, the undesirable radio conditions may be caused by an obstacle for a given antenna that may not be an obstacle for another antenna, and thus the ASDIV configuration can specify to use the other antenna to improve quality of communication at the UE 415. In an example, one or more of the switches 414 can include a dual-pole dual-throw (DPDT) switch, a 3-pole 3-throw (3P3T) switch, an N-pole N-throw switch, etc. where different active paths can be defined for different RF inputs to the switch 414, as described further herein.

In one example, communicating component 361 may specifically include, in an example, a transceiver resource manager (TRM) 430 for storing one or more parameters corresponding to the ASDIV configuration for one or more of the switches 414, such as a current RF band, an RF front end signal path from the transceiver 404 to one or more input ports of the one or more switches 414, etc. For example, TRM 430 may abstract the RF front end signal path based on an RF front end configuration table, which can be stored by and obtained from a common RF module, by determining, for instance, which RF signal path goes to which switch based on the RF front end configuration table. In an example, the signal path may be RF band specific.

Method 500 also includes, at Block 504, determining whether a target RAT supports operating using the same ASDIV switch group as the serving RAT. In an aspect, ASDIV configuring component 420, e.g., in conjunction with the processor(s) 402, memory 403, and/or transceiver 404, can determine whether the target RAT supports operating using the same ASDIV switch group (e.g., a group including one or more switches 414) as the serving RAT. For example, this may also include ASDIV configuring component 420 first determining whether ASDIV is enabled for the target RAT (and/or the source RAT), and if so the ASDIV configuring component 420 may determine whether the target RAT operates using the same ASDIV switch group as the serving RAT. In one example, determining whether ASDIV is enabled for the target RAT may be based on one or more parameters stored (e.g., at the UE 415) for communicating with the target RAT, one or more parameters received from access point 405-*a* and/or 405-*b* regarding the target RAT, and/or the like.

In an example, determining whether the target RAT operates using the same ASDIV switch group as the serving RAT at Block 504 may optionally include, at Block 506, determining whether the target RAT uses a similar operating RF band as the serving RAT. In an aspect, ASDIV configuring component 420, e.g., in conjunction with the processor(s) 402, memory 403, and/or transceiver 404, can determine whether the target RAT uses a similar operating RF band as the serving RAT. For example, ASDIV configuring component 420 may determine the operating RF band of the serving RAT from the TRM 430, which can store information regarding the operating RF band of the serving RAT based on communicating RF signals with the access point 405-*a* using the serving RAT. In an example, ASDIV configuring component 420 may determine the operating RF band of the target RAT based on instructions from the communicating component 361 to attempt inter-RAT communications with the access point 405-*b* via the target RAT via transceiver 404. ASDIV configuring component 420 can compare the operating RF band for the target RAT with that determined for the serving RAT to determine whether the operating RF bands are the same or similar (e.g., overlap), and if so, may determine that the target RAT can operate using the same or a similar ASDIV switch group or related ASDIV configuration as the serving RAT.

In another example, determining whether the target RAT operates using the same ASDIV switch group as the serving RAT at Block 504 may optionally include, at Block 508, determining whether using the target RAT results in traversing a similar RF front end signal path from a RF transceiver to one or more ASDIV switch ports as the serving RAT. In an aspect, ASDIV configuring component 420, e.g., in conjunction with the processor(s) 402, memory 403, and/or transceiver 404, can determine whether using the target RAT results in traversing a similar RF front end signal path from a RF transceiver (e.g., transceiver 404) to one or more ASDIV switch ports (e.g., switch 414 or a related port to a corresponding antenna 410, 412) as the serving RAT. For example, ASDIV configuring component 420 may determine the RF front end signal path of the serving RAT from the TRM 430, which can store information regarding the RF front end signal path used by the serving RAT from transceiver 404 to one or more switches 414 or ports thereof based on communicating RF signals with the access point 405-*a* using the serving RAT. In an example, ASDIV configuring component 420 may determine the RF front end signal path for the target RAT based on instructions from the communicating component 361 to attempt inter-RAT communications with the access point 405-*b* via the target RAT via transceiver 404. ASDIV configuring component 420 can compare the RF front end signal path to be used for communicating with the target RAT with that determined for the serving RAT to determine whether the RF front end signal paths are the same or similar (e.g., traverse the same or similar components from transceiver 404 to one or more switches 414 or related ports), and if so, may determine that the target RAT can operate using the same or a similar ASDIV switch group as the serving RAT.

In one example, ASDIV configuring component 420 can utilize an RF front end configuration table from a common RF module to determine which RF signal paths go to which switches 414 for the serving RAT. ASDIV configuring component 420, for example, can determine which RF signal paths go to which switches 414 for the target RAT based on the RF front end configuration table.

If it is determined that the target RAT operates using the same ASDIV switch group as the serving RAT at 509, method 500 also includes, at Block 510, communicating with the target node using the target RAT based on the ASDIV configuration where the target RAT operates using the same ASDIV switch group as the serving RAT (e.g., as determined at Block 504). In an aspect, inter-RAT measuring/mobility component 422, e.g., in conjunction with the processor(s) 402, memory 403, and/or transceiver 404, can communicate with the target node (e.g., access point 405-*b*) using the target RAT based on the ASDIV configuration (e.g., the ASDIV configuration used with the serving RAT) where the target RAT operates using the same ASDIV switch group as the serving RAT (e.g., as determined by ASDIV configuring component 420). For example, inter-RAT measuring/mobility component 422 can configure communicating component 361 to use the same switches 414 to communicate with the same antennas 410, 412 over the target RAT with access point 405-*b* as used in communicating over the serving RAT with access point 405-*a*. In this regard, the ASDIV configuration from the serving RAT can be inherited for communicating in the target RAT to prevent potential service interruption that may otherwise occur by using a different ASDIV configuration for the target RAT (e.g., a default ASDIV configuration for the target RAT).

In an example, communicating with the target node at Block 510 may optionally include, at Block 512, receiving one or more signals from the target node in performing inter-RAT measurements. In an aspect, inter-RAT measuring/mobility component 422, e.g., in conjunction with the processor(s) 402, memory 403, and/or transceiver 404, can receive the one or more signals from the target node (e.g., access point 405-*b*) in performing inter-RAT measurements, and may receive the one or more signals over antennas corresponding to the ASDIV configuration (e.g., the same ASDIV configuration used in communicating with the serving RAT, as described). For example, the measurements may include idle and/or connected mode measurements, which the UE 415 can communicate to the serving access point 405-*a* and/or otherwise use in determining whether to perform handover to an access point 405-*b* of the target RAT, etc.

In another example, communicating with the target node at Block 510 may optionally include, at Block 514, communicating one or more messages related to handover to the target node. In an aspect, inter-RAT measuring/mobility component 422, e.g., in conjunction with the processor(s) 402, memory 403, and/or transceiver 404, can communicate one or more messages related to handover to the target node (e.g., access point 405-*b*), and may communicate the one or more messages over antennas corresponding to the ASDIV configuration (e.g., the same ASDIV configuration used in communicating with the serving RAT, as described). For example, the handover may include circuit switched fallback (CSFB), single radio voice call continuity (SRVCC), packet switched handover (PSHO), circuit switched handover (CSHO), redirection, cell change order, etc., and the inter-RAT measuring/mobility component 422 can communicate the one or more messages to the target node (e.g., access point 405-*b*) based on the type of handover (e.g., as part of processing for the type of handover).

If it is determined that the target RAT does not operate using the same ASDIV switch group as the serving RAT at 509, method 500 may optionally include, at Block 516, communicating with the target node using the target RAT based on a default ASDIV configuration where the target RAT operates using a different ASDIV switch group than the serving RAT (e.g., as determined at Block 504). In an aspect, inter-RAT measuring/mobility component 422, e.g., in conjunction with the processor(s) 402, memory 403, and/or transceiver 404, can communicate with the target node (e.g., access point 405-*b*) using the target RAT based on a default ASDIV configuration where the target RAT operates using a different ASDIV switch group than the serving RAT (e.g., as determined by ASDIV configuring component 420). For example, where it is determined that the target node uses the different ASDIV switch group, this may indicate that the ASDIV configuration used in communicating the serving RAT may not be possible for the target node, and thus, ASDIV configuring component 420 can use the default ASDIV configuration for the target RAT (e.g., as configured in the UE 415 or otherwise specified to the UE 415 for the target RAT).

FIG. 6 illustrates a specific example of a system 600 for communicating according to an ASDIV configuration in performing inter-RAT (IRAT) handover (HO), in accordance with aspects described herein. System 600 includes a communicating component 361 and a transceiver 404. For example, communicating component 361 can communicate with or otherwise configure transceiver 404 to use ASDIV, as described above. In this specific example, at 602, communicating component 361 and/or transceiver 404 can communicate to initiate IRAT HO (e.g., to a GSM eNB), which may be based on performing one or more measurements of IRAT eNBs, a command received from a serving eNB, etc. At 604, transceiver 404 can determine to perform an LTE to GSM IRAT HO for the UE from an LTE eNB to a GSM eNB. In an example, transceiver 404 can transmit a TRM request to the communicating component 361 (e.g., for information from TRM 430) at 606. For example, the TRM request 606 can indicate the source (serving) RAT as LTE. Communicating component 361, in this example, can receive the TRM request, and can utilize the TRM (e.g., TRM 430) to check if GSM uses the same ASDIV switch group as LTE and/or to provide the ASDIV path based on the source (serving) RAT and/or ASDIV switch group at 608, as described above. In one example, communicating component 361 can obtain a RF front end configuration table from the TRM 430. Communicating component 361, in this example, can transmit a TRM granted response to the transceiver 404 at 610, which can include the ASDIV configuration being used for the source (serving) RAT. Transceiver 404 can tune on the RFM path returned by the TRM at 612 such to use the same ASDIV configuration as is used for the source (serving) RAT to prevent service interruption, as described.

FIG. 7 illustrates a specific example of a system 700 for communicating according to an ASDIV configuration in performing inter-RAT (IRAT) measurements, in accordance with aspects described herein. System 700 includes a communicating component 361 and a transceiver 404. For example, communicating component 361 can communicate with or otherwise configure transceiver 404 to use ASDIV, as described above. In this specific example, at 702, communicating component 361 and/or transceiver 404 can communicate to perform IRAT measurements (e.g., of a GSM eNB). At 704, transceiver 404 can communicate in a GSM connected mode to perform X measurements, at 706, of the GSM eNB. Transceiver 404 can communicate a set_client_state to communicating component at 708 to notify that IRAT measurements have started. Communicating component 361, in this example, can receive the set_client_state, and can utilize the TRM (e.g., TRM 430) to provide the ASDIV path based on the source (serving) RAT and/or ASDIV switch group at 710, as described above. Communicating component 361, in this example, can transmit a TRM granted response to the transceiver 404 at 712, which can include the ASDIV configuration being used for the source (serving) RAT. Transceiver 404 can execute IRAT measurement scripts with the RFM path returned by the TRM at 714 such to use the same ASDIV configuration as is used for the source (serving) RAT to prevent service interruption, as described. When the IRAT measurement gap is complete at 716, transceiver 404 can send a set_client_state 718 to communicating component 361 to indicate the IRAT measurements have ended.

Figure 8:
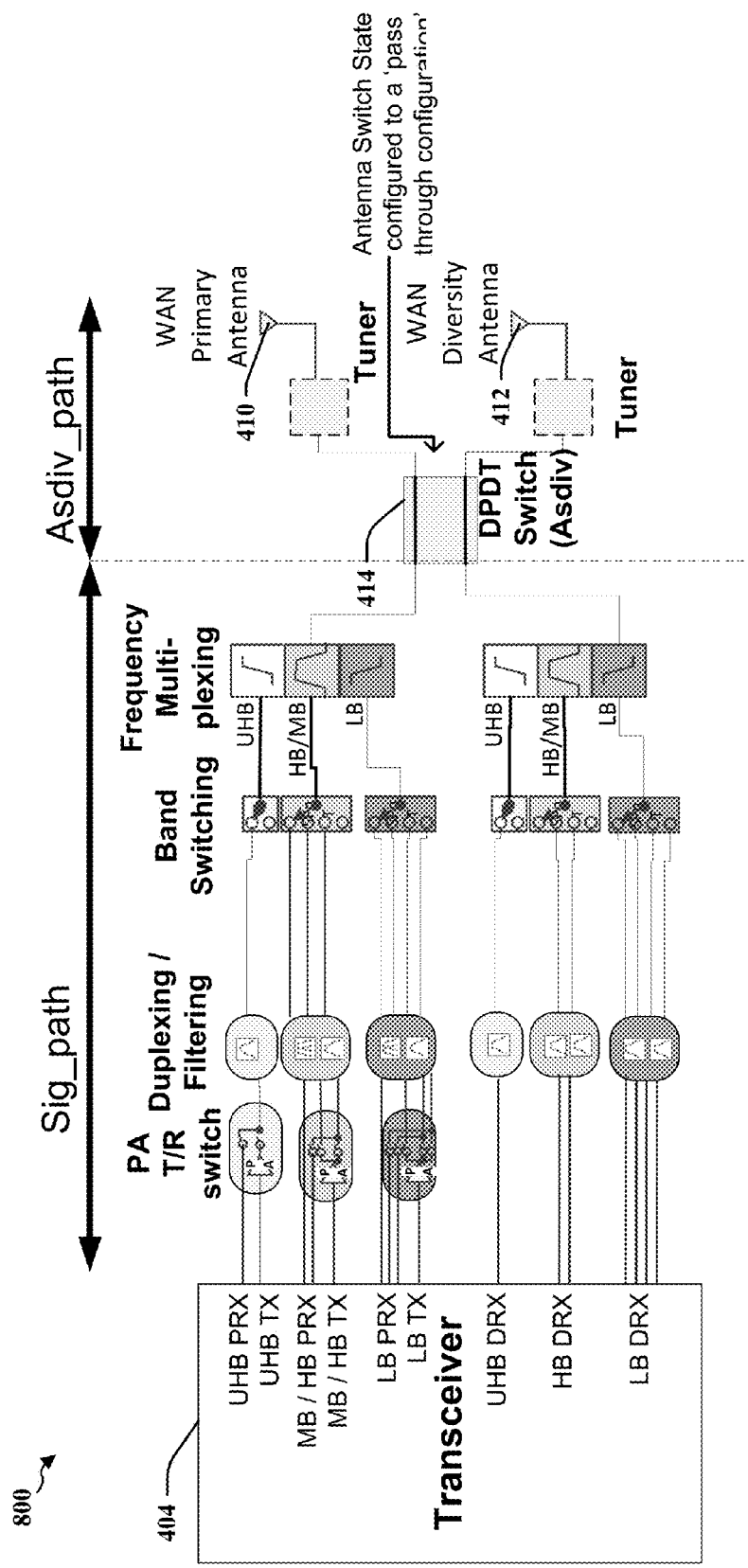
FIG. 8 illustrates an example of a system for managing antenna switch diversity with a pass-through configured switch in accordance with aspects described herein.
Figure 9:
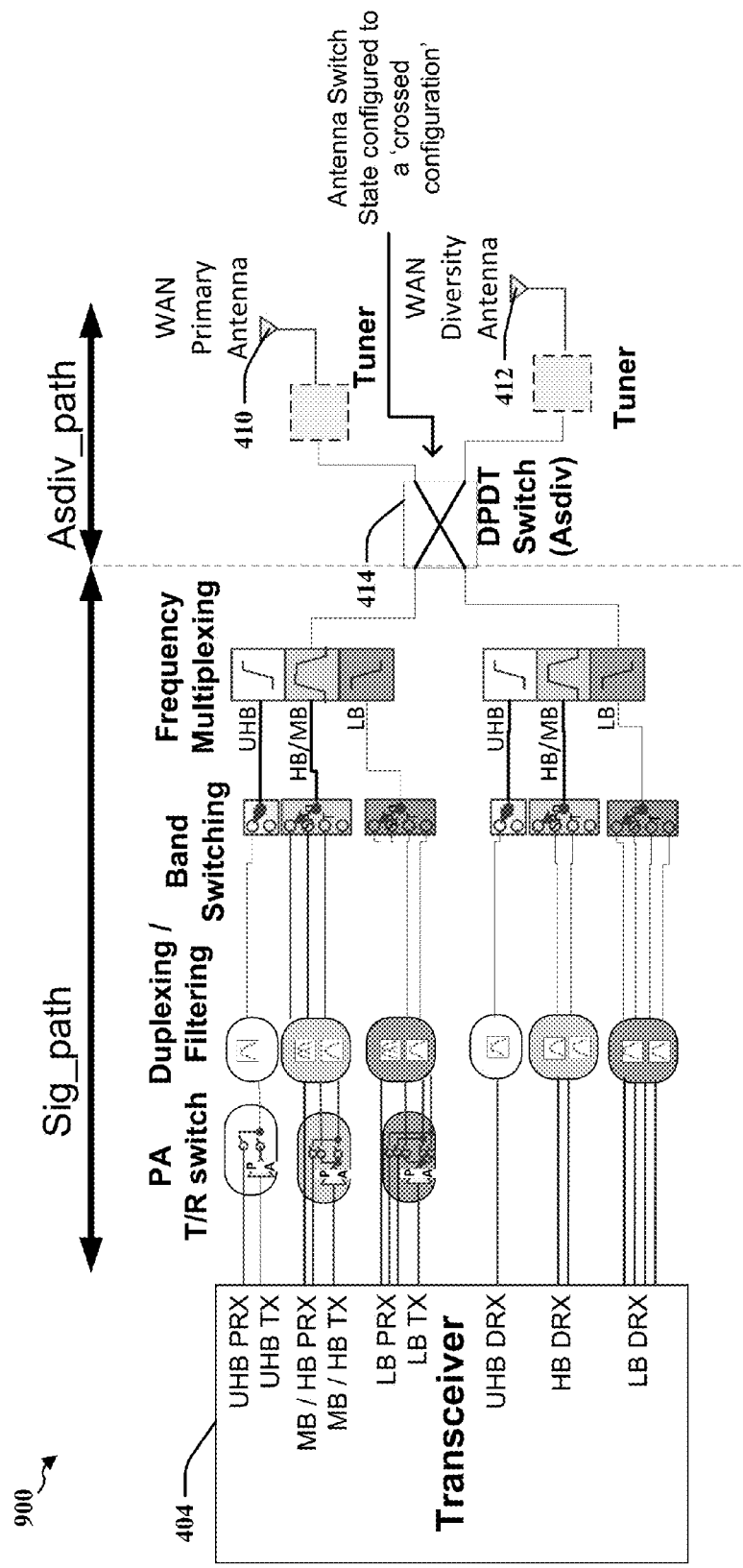
FIG. 9 illustrates an example of a system for managing antenna switch diversity with a crossed configured switch in accordance with aspects described herein.

FIGS. 8 and 9 illustrate specific examples of systems 800, 900 that include a transceiver 404, a plurality of antennas 410, 412 and one or more switches 414, as described. Thus, for example, systems 800, 900 may include a UE 415, as described herein, or substantially any wireless device that can determine an ASDIV configuration with a serving node and whether the same ASDIV configuration can be used with a target node, as described herein. Signals communicated via the plurality of antennas can traverse various signal paths to various components of a transceiver 404, as shown (e.g., ultra-high band (UHB), high band (HB), medium band (MB), and/or low band (LB) receivers (PRX/DRX) and/or transmitters (TX)). In addition, the ASDIV switch 414 can operate according to a configuration to select one or more of the antennas 410, 412 for communicating in a wireless network. As described, for example, a UE employing the transceiver 404, antennas 410, 412, and/or switches 414 of the system 800 may determine a ASDIV path and/or signal path used by a serving RAT to determine whether the same ASDIV path and/or signal path can be used by a target RAT, and can accordingly communicating in the target RAT using the same ASDIV path and/or signal path in this case.

For example, switch 414 in system 800 can utilize a pass through configuration using a DPDT switch, and switch 414 in system 900 can utilize a crossed configuration using a DPDT switch, where the pass through configuration and crossed configuration may correspond to different possible switch states of the switch 414, which can be determined in determining the ASDIV configuration, as described herein. The switch 414 can, in some examples, include a higher order of inputs, e.g., a 3P3T switch with 3 inputs and 3 output paths and the 3P3T switch has more combinations supported on how the input RF signals can be switched, an NPNT switch, etc. In any case, for example, the switch 414 can have a state defining how RF input signals are routed to the antennas 410, 412, and the state can be determined as part of the ASDIV configuration, as described, for determining whether the ASDIV configuration (and switch state) used in communicating with a source RAT (e.g., with a source node using the source RAT) can also be used in communicating with a different RAT (e.g., a target node using the different RAT), where the communicating can include performing inter-RAT measurements, inter-RAT mobility, etc., as described. As described, for example, communicating component 361 can determine whether the ASDIV configuration, switch 414 states, etc. can be used in communicating with a target RAT, and can accordingly determine whether to use the same configuration/states or a default configuration/state for the target RAT.

Figure 10:
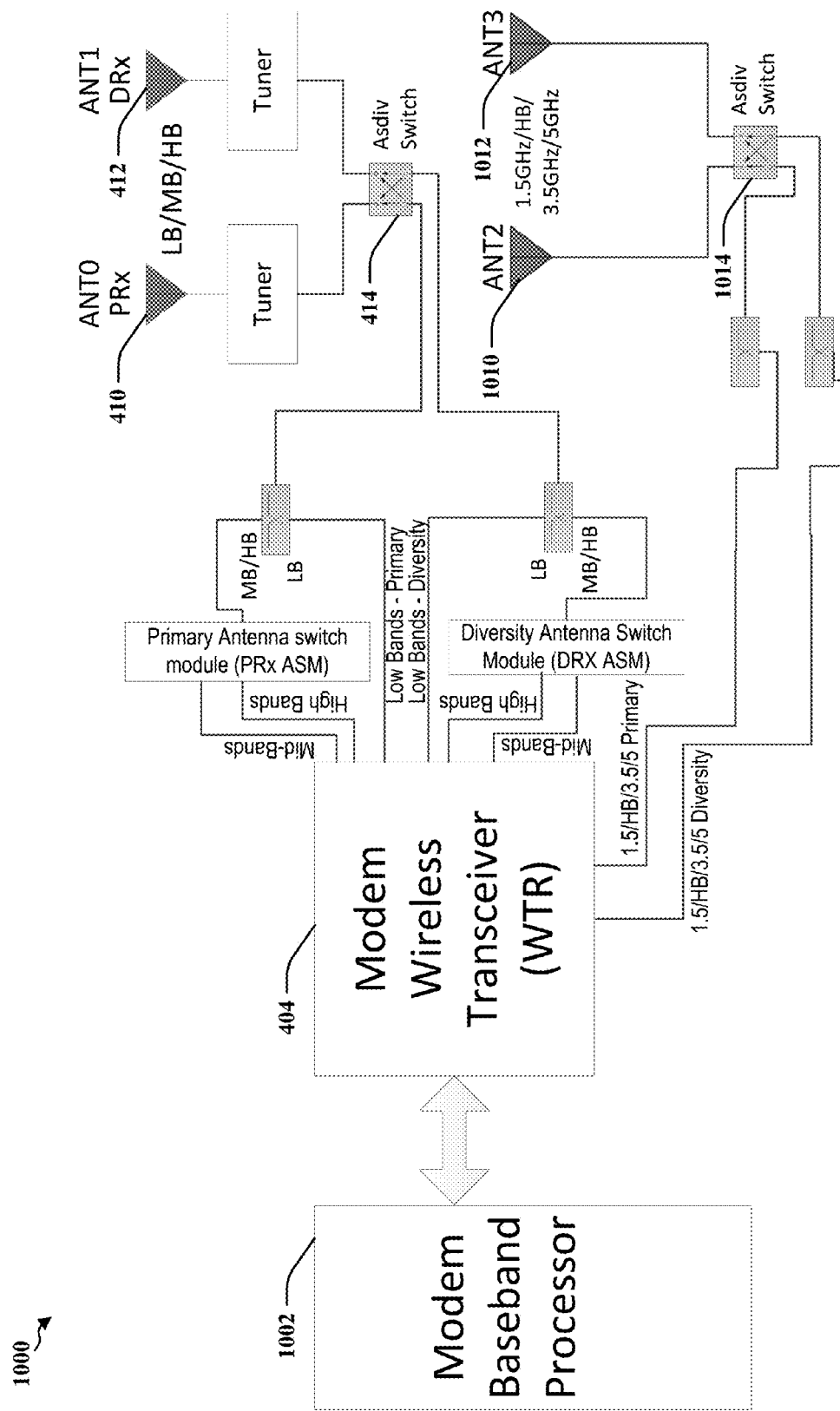
FIG. 10 illustrates an example of a system for managing antenna switch diversity of multiple switches in accordance with aspects described herein.

FIG. 10 illustrates an example of a system 1000 for that utilizes multiple antenna groups controlled by different ASDIV switches based on the RF band in use. System 1000 includes a modem baseband processor 1002 and a transceiver 404, where the modem baseband processor 1002 may enable transceiver 404 to operate at one or more RF bands, as described. System 1000 also includes a plurality of antennas 410, 412 operated by a switch 414, and a plurality of antennas 1010, 1012 operated by another switch 1014. Thus, for example, system 1000 may include a UE 415, as described herein, or substantially any wireless device that can determine (e.g., via a communicating component 361) an ASDIV configuration with a serving node and whether the same ASDIV configuration can be used with a target node, as described herein. In this example, the ASDIV configuration for communications with the serving node may use an ASDIV switch group including multiple switches 414, 1014, and system 1000 can determine whether the ASDIV switch group including the multiple switches 414, 1014 may be used with the target node, as described herein.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for using antenna-switched diversity (ASDIV) in wireless communications, comprising:
communicating with a serving node using a serving radio access technology (RAT) and based on an ASDIV configuration, wherein the ASDIV configuration defines an antenna switching configuration including a state of one or more switches in an ASDIV switch group for switching between one or more antennas for the communicating based on sensing one or more parameters of the communicating;

determining whether a target RAT supports operating using a same ASDIV switch group as the serving RAT; and communicating with a target node using the target RAT and based on the ASDIV configuration where the target RAT operates using the same ASDIV switch group as the serving RAT, wherein determining whether the target RAT supports operating using the same ASDIV switch group as the serving RAT comprises determining whether using the target RAT results in traversing a same radio frequency (RF) front end signal path from a RF transceiver output to one or more ASDIV switch ports of the one or more switches as the serving RAT.

2. The method of claim 1, further comprising communicating with the target node using the target RAT and based on a default ASDIV configuration where the target RAT supports operating using a different ASDIV switch group than the serving RAT.

3. The method of claim 1, wherein communicating with the target node comprises communicating one or more messages related to performing handover to the target node using the target RAT and based on the ASDIV configuration.

4. The method of claim 1, wherein communicating with the target node comprises receiving one or more signals received from the target node using the target RAT and based on the ASDIV configuration in performing inter-RAT measurement of the target node.

5. The method of claim 1, wherein determining whether the target RAT supports operating using the same ASDIV switch group as the serving RAT comprises determining whether the target RAT uses a same operating radio frequency (RF) band as the serving RAT.

6. The method of claim 1, further comprising:
storing one or more parameters corresponding to at least one of the ASDIV configuration or the one or more switches, wherein the one or more parameters include at least one of a current RF band or an RF front end signal path from a transceiver to the one or more antennas, wherein determining whether the target RAT supports operating using the same ASDIV switch group as the serving RAT is based at least in part on the one or more parameters.

7. The method of claim 1, wherein determining whether the target RAT supports operating using a same ASDIV switch group as the serving RAT comprises determining whether the target RAT supports ASDIV.

8. An apparatus for using antenna-switched diversity (ASDIV) in wireless communications, comprising:
a plurality of antennas for transmitting and receiving signals in wireless communications;
a transceiver coupled with the plurality of antennas and including a radio frequency (RF) front end with a plurality of components for generating the signals, wherein the plurality of components include one or more ASDIV switches coupled to the plurality of antennas to enable switching between one or more of the plurality of antennas for transmitting and receiving the signals;
a memory; and
at least one processor coupled to the memory and the transceiver, wherein the at least one processor is configured to:

communicate, via the transceiver, with a serving node using a serving radio access technology (RAT) and based on an ASDIV configuration, wherein the ASDIV configuration defines an antenna switching configuration including a state of one or more switches in an ASDIV switch group for switching between one or more antennas for the communicating based on sensing one or more parameters of the communicating;

determine whether a target RAT supports operating using a same ASDIV switch group as the serving RAT; and communicate, via the transceiver, with a target node using the target RAT and based on the ASDIV configuration where the target RAT operates using the same ASDIV switch group as the serving RAT, wherein the at least one processor is configured to determine whether the target RAT operates using the same ASDIV switch group as the serving RAT at least in part by determining whether using the target RAT results in traversing a same signal path in the RF front end from an output of the transceiver to one or more ports of the one or more ASDIV switches as the serving RAT.

9. The apparatus of claim 8, wherein the at least one processor is further configured to communicate, via the transceiver, with the target node using the target RAT and based on a default ASDIV configuration where the target RAT supports operating using a different ASDIV switch group than the serving RAT.

10. The apparatus of claim 8, wherein the at least one processor is configured to communicate with the target node at least in part by communicating one or more messages related to performing handover to the target node using the target RAT and based on the ASDIV configuration.

11. The apparatus of claim 8, wherein the at least one processor is configured to communicate with the target node at least in part by receiving one or more signals received from the target node using the target RAT and based on the ASDIV configuration in performing inter-RAT measurement of the target node.

12. The apparatus of claim 8, wherein the at least one processor is configured to determine whether the target RAT operates using the same ASDIV switch group as the serving RAT at least in part by determining whether the target RAT uses a same operating radio frequency (RF) band as the serving RAT.

13. The apparatus of claim 8, wherein the at least one processor is further configured to store one or more parameters corresponding to at least one of the ASDIV configuration or the one or more switches, wherein the one or more parameters include at least one of a current RF band or an RF front end signal path from the transceiver to the one or more antennas, wherein the at least one processor is configured to determine whether the target RAT supports operating using the same ASDIV switch group as the serving RAT based at least in part on the one or more parameters.

14. The apparatus of claim 8, wherein the at least one processor is configured to determine whether the target RAT supports operating using a same ASDIV switch group as the serving RAT at least in part by determining whether the target RAT supports ASDIV.

15. An apparatus for using antenna-switched diversity (ASDIV) in wireless communications, comprising:
means for communicating with a serving node using a serving radio access technology (RAT) and based on an ASDIV configuration, wherein the ASDIV configuration defines an antenna switching configuration including a state of one or more switches in an ASDIV switch group for switching between one or more antennas for the communicating based on sensing one or more parameters of the communicating;

means for determining whether a target RAT supports operating using a same ASDIV switch group as the serving RAT; and means for communicating with a target node using the target RAT and based on the ASDIV configuration where the target RAT operates using the same ASDIV switch group as the serving RAT, wherein the means for determining determines whether the target RAT supports operating using the same ASDIV switch group as the serving RAT at least in part by determining whether using the target RAT results in traversing a same radio frequency (RF) front end signal path from a RF transceiver output to one or more ASDIV switch ports of the one or more switches as the serving RAT.

16. The apparatus of claim 15, further comprising means for communicating with the target node using the target RAT and based on a default ASDIV configuration where the target RAT supports operating using a different ASDIV switch group than the serving RAT.

17. The apparatus of claim 15, wherein the means for communicating communicates with the target node at least in part by communicating one or more messages related to performing handover to the target node using the target RAT and based on the ASDIV configuration.

18. The apparatus of claim 15, wherein the means for communicating communicates with the target node at least in part by receiving one or more signals received from the target node using the target RAT and based on the ASDIV configuration in performing inter-RAT measurement of the target node.

19. The apparatus of claim 15, wherein the means for determining determines whether the target RAT supports operating using the same ASDIV switch group as the serving RAT at least in part by determining whether the target RAT uses a same operating radio frequency (RF) band as the serving RAT.

20. The apparatus of claim 15, further comprising:

means for storing one or more parameters corresponding to at least one of the ASDIV configuration or the one or more switches, wherein the one or more parameters include at least one of a current RF band or an RF front end signal path from a transceiver to the one or more antennas, wherein the means for determining determines whether the target RAT supports operating using the same ASDIV switch group as the serving RAT is based at least in part on the one or more parameters.

21. A non-transitory computer-readable storage medium comprising computer-executable code for using antenna-switched diversity (ASDIV) in wireless communications, the code comprising:

code for communicating with a serving node using a serving radio access technology (RAT) and based on an ASDIV configuration, wherein the ASDIV configuration defines an antenna switching configuration including a state of one or more switches in an ASDIV switch group for switching between one or more antennas for the communicating based on sensing one or more parameters of the communicating;

code for determining whether a target RAT supports operating using a same ASDIV switch group as the serving RAT; and code for communicating with a target node using the target RAT and based on the ASDIV configuration where the target RAT operates using the same ASDIV switch group as the serving RAT, wherein the code for determining determines whether the target RAT supports operating using the same ASDIV switch group as the serving RAT at least in part by determining whether using the target RAT results in traversing a same radio frequency (RF) front end signal path from a RF transceiver output to one or more ASDIV switch ports of the one or more switches as the serving RAT.

22. The non-transitory computer-readable storage medium of claim 21, further comprising code for communicating with the target node using the target RAT and based on a default ASDIV configuration where the target RAT supports operating using a different ASDIV switch group than the serving RAT.

23. The non-transitory computer-readable storage medium of claim 21, wherein the code for communicating communicates with the target node at least in part by communicating one or more messages related to performing handover to the target node using the target RAT and based on the ASDIV configuration.

24. The non-transitory computer-readable storage medium of claim 21, wherein the code for communicating communicates with the target node at least in part by receiving one or more signals received from the target node using the target RAT and based on the ASDIV configuration in performing inter-RAT measurement of the target node.

25. The non-transitory computer-readable storage medium of claim 21, wherein the code for determining determines whether the target RAT supports operating using the same ASDIV switch group as the serving RAT at least in part by determining whether the target RAT uses a same operating radio frequency (RF) band as the serving RAT.

26. The non-transitory computer-readable storage medium of claim 21, further comprising:

code for storing one or more parameters corresponding to at least one of the ASDIV configuration or the one or more switches, wherein the one or more parameters include at least one of a current RF band or an RF front end signal path from a transceiver to the one or more antennas, wherein the code for determining determines whether the target RAT supports operating using the same ASDIV switch group as the serving RAT is based at least in part on the one or more parameters.

27. The apparatus of claim 15, wherein the means for determining determines whether the target RAT supports operating using the same ASDIV switch group as the serving RAT at least in part by determining whether the target RAT supports ASDIV.

28. The non-transitory computer-readable storage medium of claim 21, wherein the code for determining determines whether the target RAT supports operating using the same ASDIV switch group as the serving RAT at least in part by determining whether the target RAT supports ASDIV.

* * * * *